United States Patent
Yoo et al.

(10) Patent No.: US 7,706,669 B2
(45) Date of Patent: Apr. 27, 2010

(54) RECORDING MEDIUM HAVING DATA STRUCTURE FOR MANAGING VIDEO DATA AND ADDITIONAL CONTENT DATA THEREOF AND RECORDING AND REPRODUCING METHODS AND APPARATUSES

(75) Inventors: Jea Yong Yoo, Seoul (KR); Byung Jin Kim, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 1286 days.

(21) Appl. No.: 10/875,687

(22) Filed: Jun. 25, 2004

(65) Prior Publication Data
US 2004/0264936 A1    Dec. 30, 2004

(30) Foreign Application Priority Data
Jun. 27, 2003    (KR) .................. 10-2003-0042742

(51) Int. Cl.
*H04N 5/76*    (2006.01)
*H04N 7/00*    (2006.01)
*H04N 5/00*    (2006.01)

(52) U.S. Cl. ......................................... 386/125; 386/95
(58) Field of Classification Search .................... 386/1, 386/45–46, 95–96, 125–126
See application file for complete search history.

(56) References Cited

U.S. PATENT DOCUMENTS

| | | | |
|---|---|---|---|
| 6,246,402 B1 | 6/2001 | Setogawa et al. | |
| 6,266,478 B1 * | 7/2001 | Yoshio et al. | 386/46 |
| 6,618,551 B1 * | 9/2003 | Tanaka et al. | 386/96 |
| 7,346,920 B2 * | 3/2008 | Lamkin et al. | 386/125 |
| 2002/0106193 A1 | 8/2002 | Park et al. | |
| 2003/0095794 A1 | 5/2003 | Chung et al. | |

FOREIGN PATENT DOCUMENTS

| EP | 0 737 009 B1 | 1/2000 |
|---|---|---|
| EP | 0 737 979 B1 | 10/2006 |

OTHER PUBLICATIONS

International Search Report issued September 22, 2004 in International Patent App. No. PCT/KR2004/001560.

* cited by examiner

*Primary Examiner*—Thai Tran
*Assistant Examiner*—Nigar Chowdhury
(74) *Attorney, Agent, or Firm*—Harness, Dickey & Pierce, P.L.C.

(57) ABSTRACT

The present invention relates to a data structure for managing video data and additional content data recorded on a recording medium. A recording medium having data structure in accordance with the present invention comprises a navigation area storing at least one first-typed object and at least one second-typed object, wherein each of the objects indicates at least one playlist to reproduce, the first-typed object includes at least one navigation command for managing reproduction of main data recorded on the recording medium, the second-typed object includes at least one navigation command for managing reproduction of additional content data to be reproduced with the main data, and the at least one playlist indicated by the second-typed object includes reproducing information related with the additional content data.

42 Claims, 6 Drawing Sheets

| index.bdmv | type_indicator | | | | | |
| --- | --- | --- | --- | --- | --- | --- |
| | version_number | | | | | |
| | indexes() | length | | | | |
| | | name_character_set | | | | |
| | | FirstPlayback() | | FirstPlayback_ref_to_mobj_id | | |
| | | | | FirstPlayback_name_length | | |
| | | | | FirstPlayback_name | | |
| | | Top Menu () | | TopMenu_ref_to_moj_id | | |
| | | | | TopMenu_ref_to_woj_id | | |
| | | | | TopMenu_name_lengh | | |
| | | | | TopMenu_name | | |
| | | number_of_Titles | | | | |
| | | Title [title_number] () | | Title_ref_to_moj_id [ title_number ] | | |
| | | | | Title_ref_to_woj_id [ title_number ] | | |
| | | | | Title_name_length [ title_number ] | | |
| | | | | Title_name [ title_number ] | | |

FIG. 5

| MovieObject.bdmv | type_indicator | | | | | | |
| --- | --- | --- | --- | --- | --- | --- | --- |
| | version_number | | | | | | |
| | MovieObjects () | length | | | | | |
| | | flags | | | | | |
| | | number_of_mobjs | | | | | |
| | | MovieObject () | number_of_commands [ mobj_id ] | | | | |
| | | | command [ mobj_id ] [ i ] | | | | |
| WebObject.bdmv | type_indicator | | | | | | |
| | version_number | | | | | | |
| | WebObjects () | length | | | | | |
| | | flags | | | | | |
| | | number_of_wobjs | | | | | |
| | | WebObject () | web_ref_to_mobj_id[ wobj_id ] | | | | |
| | | | number_of_commands [ wobj_id ] | | | | |
| | | | command [ wobj_id ] [ i ] | | | | |

FIG. 6

RECORDING MEDIUM HAVING DATA STRUCTURE FOR MANAGING VIDEO DATA AND ADDITIONAL CONTENT DATA THEREOF AND RECORDING AND REPRODUCING METHODS AND APPARATUSES

FOREIGN PRIORITY

The present invention claims priority under 35 U.S.C. 119 on Korean Application No. 10-2003-042742 filed Jun. 27, 2003; the contents of which are incorporated by reference in their entirety.

BACKGROUND OF THE INVENTION

FIELD OF THE INVENTION

The present invention relates to a recording medium having a data structure for managing main data and additional content data recorded thereon as well as methods and apparatuses for reproduction and recording the data structure.

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

On the other hand, the standardization for high-density read-only optical disks such as a Blu-ray ROM (BD-ROM) is also still under way. The BD-ROM can accommodate not only main A/V data but also additional contents associated with the main A/V data.

However, an effective data structure for recording and managing such additional contents along with the main data on the high-density read-only optical disk such as a BD-ROM is not yet available.

SUMMARY OF THE INVENTION

It is an object of the present invention to provide a recording medium, such as a computer-readable medium, having a data structure for accommodating additional content data of main video data to file structure of the recording medium and managing them recorded thereon, and methods and apparatuses for recording and reproducing the video data on such a recording medium.

A recording medium having a data structure for managing main video and its additional content data in accordance with the present invention comprises a navigation area storing at least one first-typed navigation command group and at least one second-typed navigation command group, each of the navigation command groups indicating at least one playlist to reproduce, the first-typed navigation command group including at least one navigation command for managing reproduction of main data recorded on the recording medium, the second-typed navigation command group including at least one navigation command for managing reproduction of additional content data to be reproduced with the main data, and the at least one playlist indicated by the second-typed navigation command group including reproducing information related with the additional content data.

In one embodiment, main video data and the additional content data associated therewith are interleaved each other in a single clip file.

In another embodiment, the additional content data is stored in a remote server connected through a network.

In yet another embodiment, a command group for reproducing of the additional content data and another command group for reproducing of the main video data are stored in mutually different navigation files.

The present invention further provides apparatuses and methods for recording and reproducing the data structure according to the present invention, and recording and reproducing according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
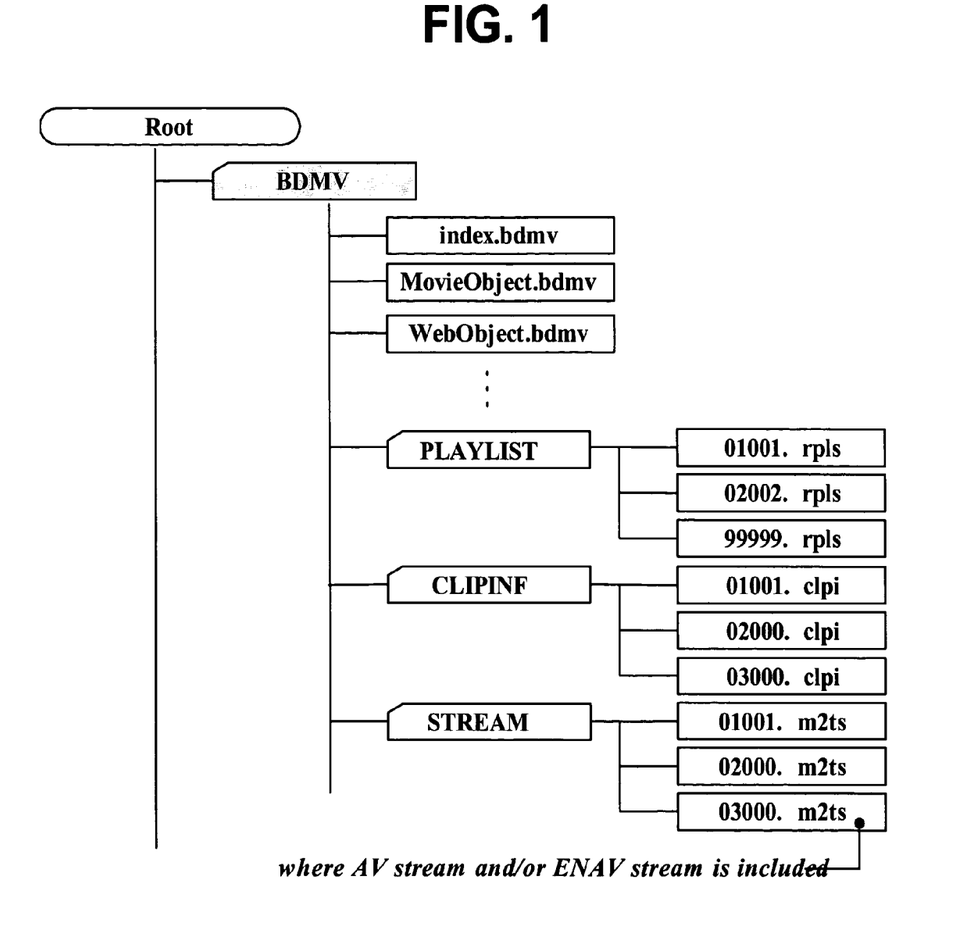
FIG. 1 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 1.

As shown in FIG. 1, the root directory contains at least one BDMV directory. The BDMV directory includes an index file 'index.bdmv', a movie object file 'MovieObject.bdmv', and a web object file 'WebObject.bdmv', a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The index file 'index.bdmv' included in the BDMV directory stores information to describe the content of the BDMV directory. The movie object file 'MovieObject.bdmv' and the web object file 'WebObject.bdmv' store information of one or more movie objects respectively. The movie object and the web object, each being associated with one or more playlists, consist of at least one executable navigation command respectively, that is, the movie object and the web object are navigation command group and each command of the group is to manage reproduction of data included in at least one clip file pertaining to the movie object.

The STREAM directory includes MPEG2-formatted A/V stream files called clips (*.m2ts). Each clip file includes only A/V stream or both stream of A/V and additional content data. Main A/V and additional content data in a single clip file are multiplexed or interleaved each other in a certain unit, e.g., in the unit of a PES (Packetized Elementary Stream) packet. The A/V stream includes source packets of video and audio data or additional content data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips. Namely, the real playlist is considered as referring to parts of clips, and therefore, conceptually considered equivalent in disk space to the referred to parts of the clips.

Figure 2:
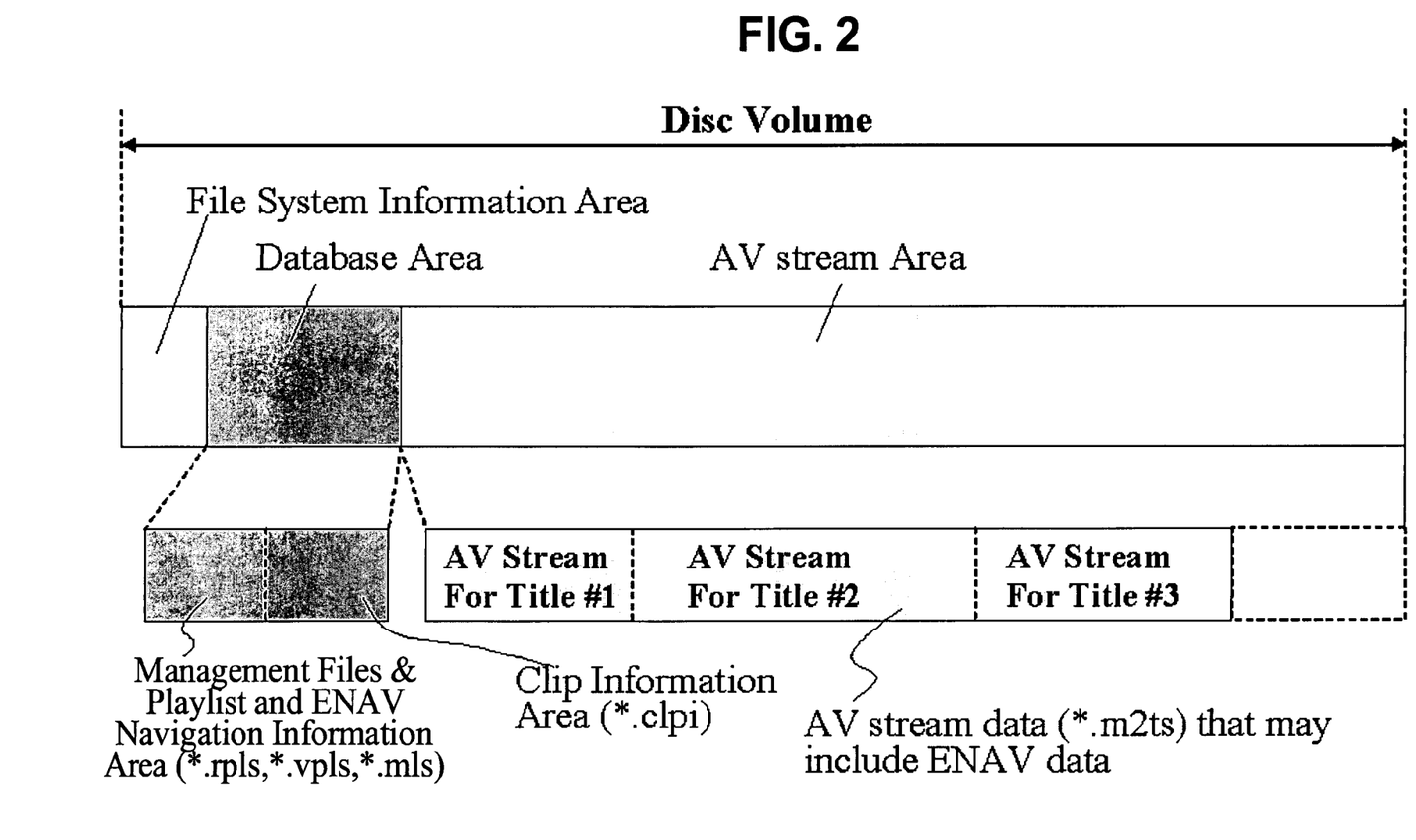
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the management information files such as index.bdmv, MovieObject.bdmv, and WebObject.bdmv are recorded in one or more management information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area.

The data base area includes a management information file and playlist and additional content navigation information area and a clip information area. The management information file and playlist and additional content navigation information area have the management information files 'index.bdmv', 'MovieObject.bdmv' and 'WebObject.bdmv' recorded in a general information file area thereof, the ENAVNAVI directory and navigation information files recorded therein, and the PLAYLIST directory and playlist files recorded in a playlist information area thereof. The clip information area has the CLIPINFO directory and associated clip information files recorded therein. The A/V stream area has the A/V streams (where only A/V data is contained or additional content data is interleaved) for the various titles and/or ENAV streams recorded therein. The additional content data can be recorded as a separate clip file (*.m2ts) instead of being interleaved with A/V stream.

The clip information file (*.clpi) associated with a clip file containing additional content data (also called 'ENAV data') may include stream coding type information to indicate whether the additional content data is to be presented in synchronization with main A/V stream or not.

The additional content data has a unique ID that is different from those assigned to main A/V stream, e.g., a video stream such as MPEG-2 video stream, an audio stream such as HDMV LPCM audio stream, Dolby AC-3 audio stream and dts audio stream, and subtitle graphic stream such as presentation graphics stream and an interactive graphics stream.

Video and audio data recorded on a recording medium are typically organized as individual titles; for example, different movies represented by the video and audio data are organized as different titles. Furthermore, a title may be organized into individual chapters in much the same way a book is often organized into chapters.

Figure 3:
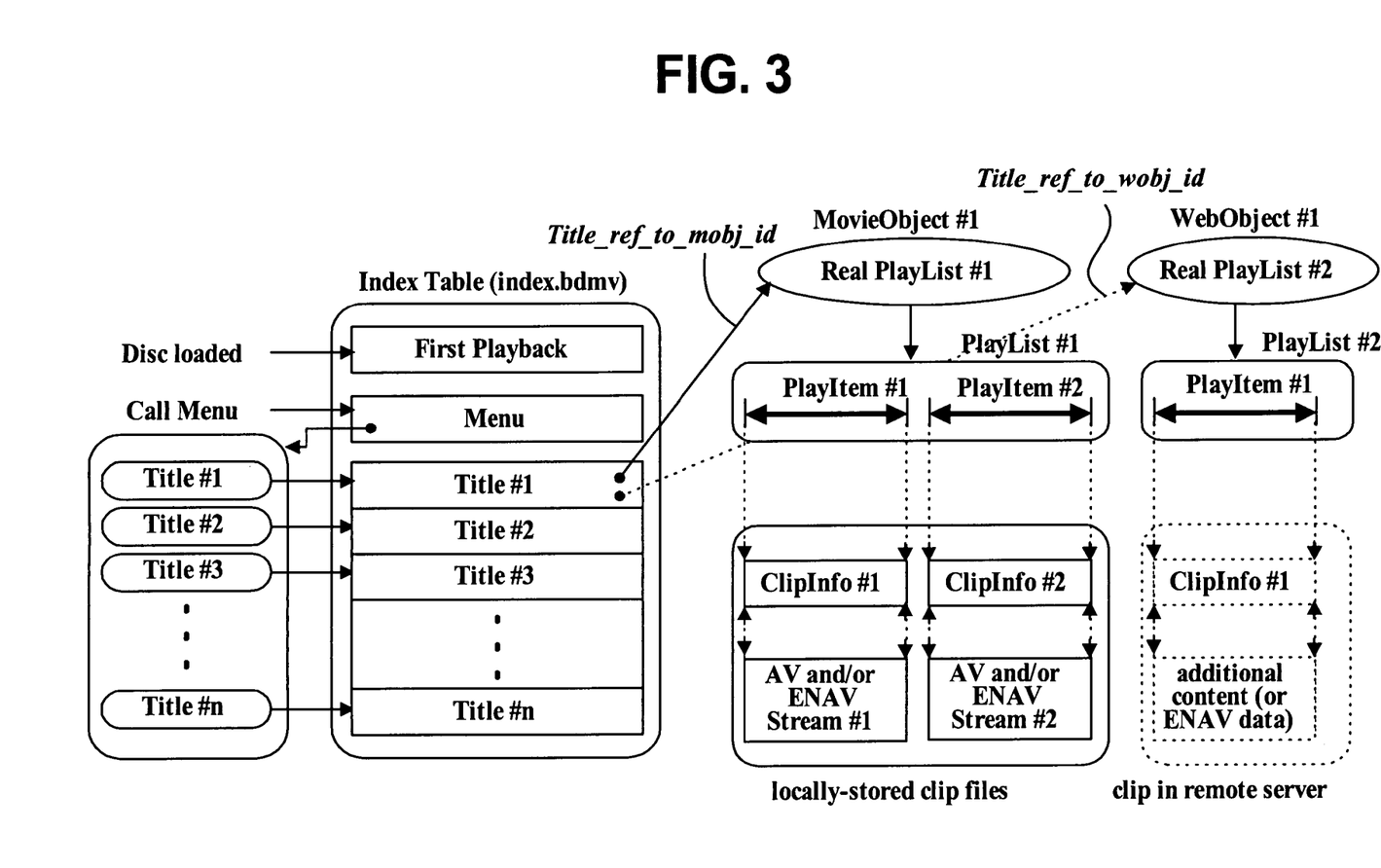
FIG. 3 illustrates a data structure recorded on a BD-ROM in accordance with the present invention.

The data structure according to the present invention includes an illustrative structure shown in FIG. 3 and also includes navigation information for managing reproducing of main video data and additional content data in the structure of FIG. 3 recorded on the recording medium.

In the data structure of FIG. 3, the index file index.bdmv includes an index table 'Index Table' having the main menu 'Menu' and title information and a first playback 'First Playback' information, and the information in the index table performs reproduction of a corresponding data through link information one to one mapping the specific object in the corresponding movie object file 'MovieObject.bdmv' or the specific web object in the corresponding web object file 'WebObject.bdmv'.

Accordingly, the main menu information in the index table 'Index Table' is performed by a user request "Call Menu", and in the main menu, a basic title menu 'Title' is included, thus the user can select one of the title menu the user want to reproduce.

If the user selected the title #1 that is mapped to an object i.e., MovieObject #1 or WebObject #1 or both determined by link information in the title #1 information of the index table, the play list, for example PlayList #1 or PlayList #2, or both of the play lists determined by corresponding command in the corresponding movie object and/or web object is reproduced. The additional content data linked with the web object is stored in a recording medium as a clip file or in a remote server connected through a network. In the event that it is stored in the remote server as illustrated in FIG. 3, it will be presented after being downloaded from the server.

The play list PlayList #1 or PlayList #2 including at least one plat item PlayItem performs the clip file 'Clip' for reproducing the specific data, e.g., video data and/or additional content data corresponding to the title #1.

The first playback 'First Playback' information in the index table 'Index Table', the first playback information including link information being automatically loaded when the disc is loaded, is reproduced by the play list file and clip file in the same way the title #1 is reproduced.

Accordingly, in the process for reproducing the corresponding title, started from the main menu, although the user can select the method for reproduction only through the main menu information, the main menu is limitedly provided with only main menu information needed for the total disc, and there is a limitation in properly providing the main menu according to the attribution of the recorded data, e.g., video data and/or additional content data.

The writing of the above-explained data structures according to the present invention may be applicable to the manufacturing process in case of a read-only disk like BD-ROM.

Figure 4:
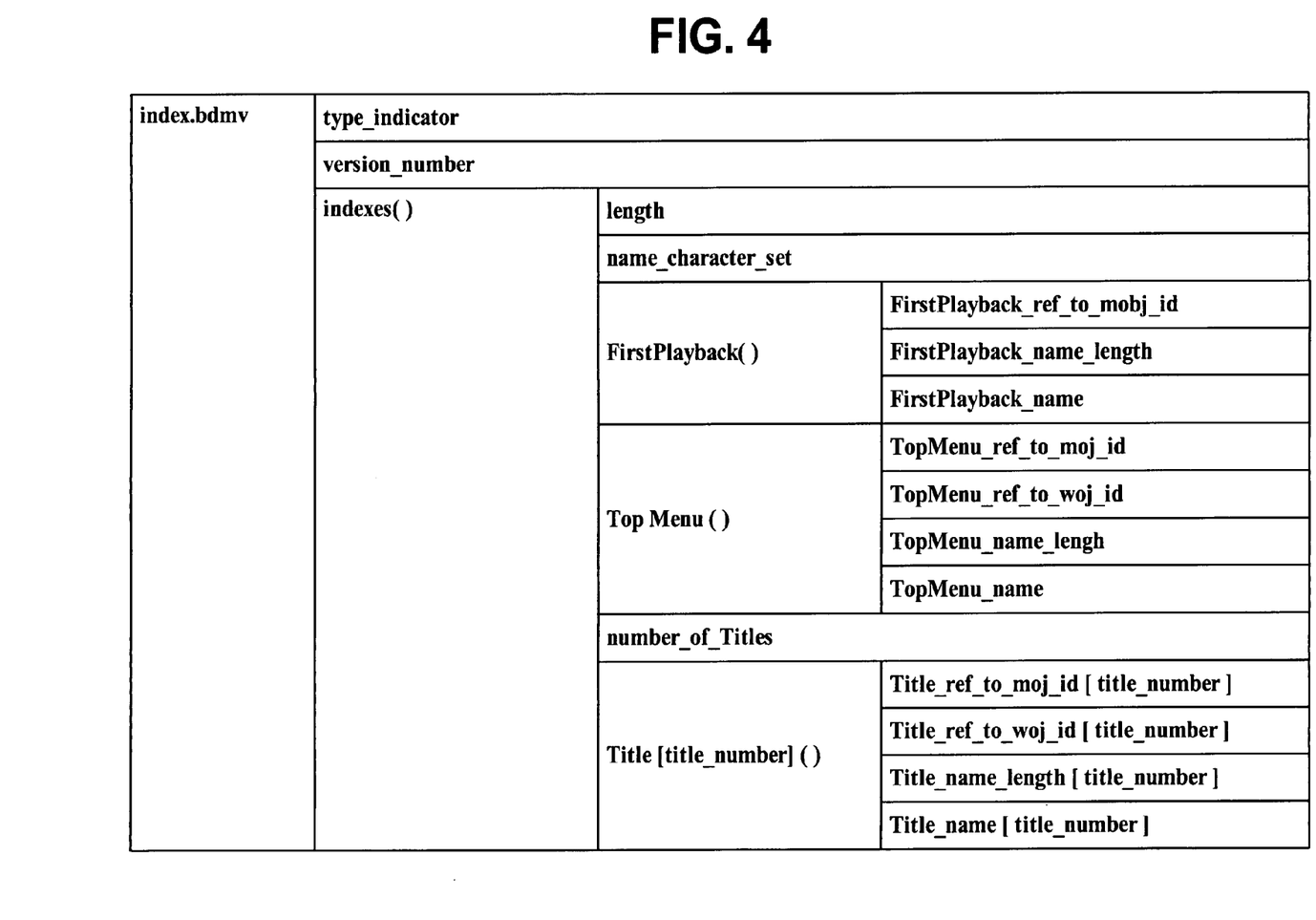
FIG. 4 illustrates structure of an index file according to the present invention.

FIG. 4 shows structure of the index file 'index.bdmv' in more detail. The index file, as shown in FIG. 4, includes a type indicator 'type_indicator', a version number 'version_number', and index information 'indexes( )'. The index information has its fields of length 'length' indicative of its size, character set 'name_character_set' indicative of character code scheme assigned to the title name subfield 'Title_name[ ]', first playback 'FirstPlayback( )', top menu 'Top Menu( )', the number of titles 'number_of_Titles' included therein, and a plurality of title entries 'Title(i)' that contain title information individually.

The first playback field 'FirstPlayback( )' includes its subfields of ID of a movie object 'FirstPlayback_ref_to_mobj_id' to be played first, length of name 'FirstPlayback_name_length' given to the first playback, and the name 'FirstPlayback_name'. The top menu field 'Top Menu ( )' has its subfields of ID of an associated movie object 'TopMenu_ref_to_mobj_id', another ID of an associated web object 'TopMenu_ref_to_wobj_id', length of name 'TopMenu_name_ length' given to the top menu, and the top menu name 'TopMenu_name'.

Each of the title entries 'Title[i]' consists subfields of ID of a movie object 'Title_ref_to_moj_id' associated with the title entry, another ID of a web object 'Title_ref_to_woj_id', length of name 'Title_name_length' given to the title, and the title name 'Title_name'.

Figure 5:
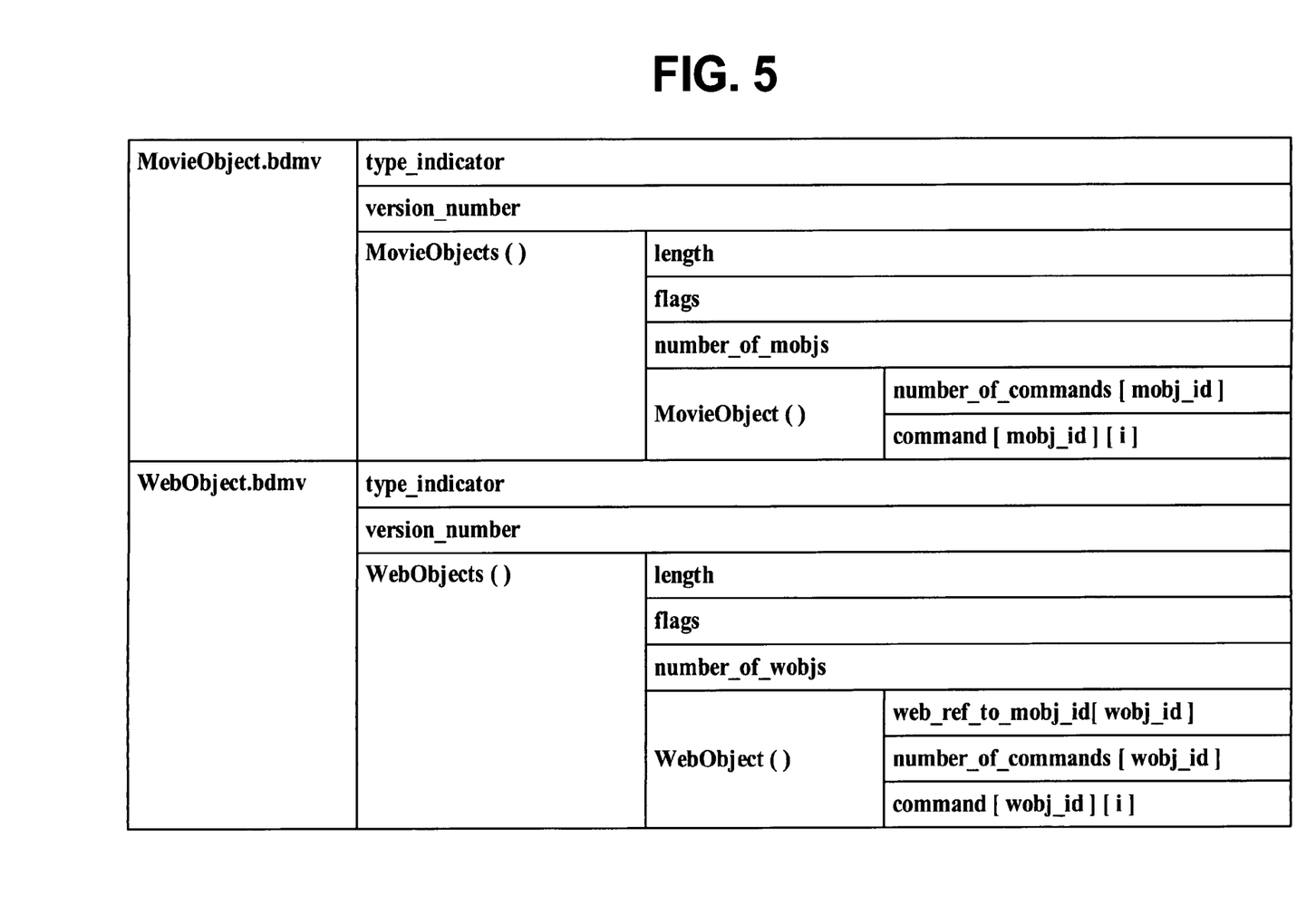
FIG. 5 illustrates structures of a movie object file and a web object file according to the present invention.

FIG. 5 shows structures of the object files 'MovieObject.bdmv' and 'WebObject.bdmv' in more detail. The movie object file 'MovieObject.bdmv', as shown in FIG. 5, includes a type indicator 'type_indicator', a version number 'version_number', and a movie objects group 'Movie Objects( )'. The movie object group has its fields of length 'length' indicative of its size in byte, attribute flag 'flags' indicative of attributes of associated movie objects, the number of movie objects 'number_of_mobjs' included therein, and contents of movie objects 'MovieObject( )'.

The movie object contents field 'MovieObject( )' consists of, for each movie object, subfields of commands 'command[ ] [i]' to execute for a movie object and the number of commands 'number_of_commands[ ]'.

The web object file 'WebObject.bdmv', as shown in FIG. 5, includes a type indicator 'type_indicator', a version number 'version_number', and a web object group 'WebObjects( )'. The web object group has its fields of length 'length' indicative of its size in byte, attribute flag 'flags' indicative of attributes of associated web objects, the number of web objects 'number_of_wobjs' included therein, and contents of web objects 'WebObject( )'.

The web object contents field 'WebObject( )' consists of, for each web object, subfields of commands 'command[ ] [i]' to execute for a web object and the number of commands 'number_of_commands[ ]'. The web object contents field 'WebObject( )' can also include ID of a related movie object 'web_ref_to_mobj_id[ ]' optionally, if a web object is associated with a certain movie object that can be switched from the web object.

Figure 6:
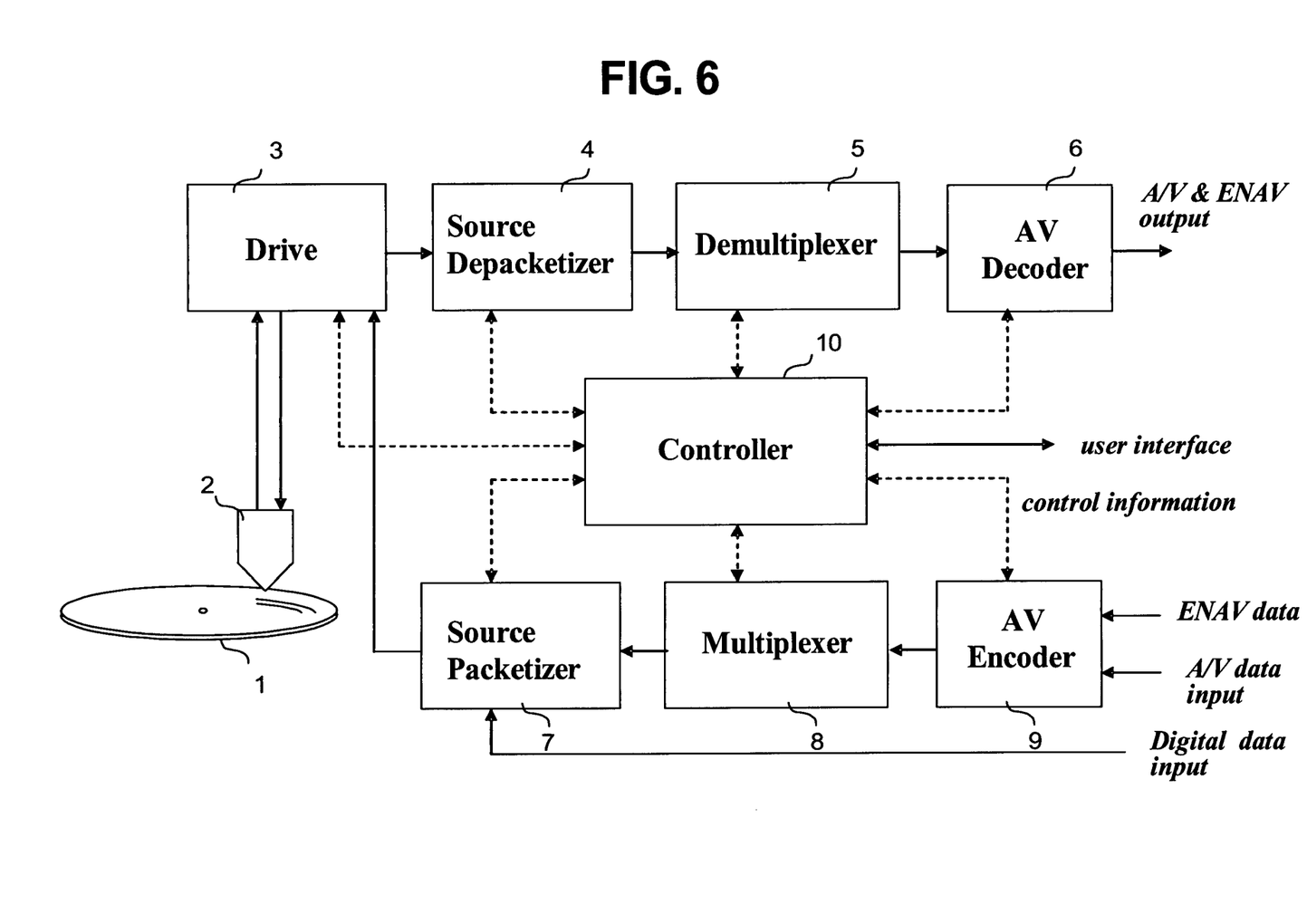
FIG. 6 illustrates schematic diagrams of an embodiment of an optical disk recording and reproducing apparatus according to the present invention.

FIG. 6 illustrates a schematic diagram of an embodiment of an optical disk recording and reproducing apparatus according to the present invention. As shown, an AV encoder 9 receives and encodes audio and video data, subtitle data, or ENAV data. The AV encoder 9 outputs the encoded audio and video data along with coding information and stream attribute information. A multiplexer 8 multiplexes the encoded audio and video data (or subtitle data, ENAV data) based on the coding information and stream attribute information to create, for example, an MPEG-2 transport stream. A source packetizer 7 packetizes the transport packets from the multiplexer 8 into source packets in accordance with the audio/video, subtitle, or ENAV format of the optical disk. As shown in FIG. 6, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk. At this time, the controller 10 controls the source packetizer 7 to align the audio/video data packets and ENAV data packets in interleaved manner.

The controller 10 also creates the navigation and management information for managing reproduction of the audio/video data and ENAV data being recorded on the optical disk. For example, based on information received via the user interface (e.g., instruction set saved on disk, provided over an intranet or internet by a computer system, etc.) the controller 10 controls the drive 3 to record the data structure of FIGS. 1 to 5 on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video and ENAV source packets from the optical disk. For example, the user input may specify a playlist or a title to reproduce. This user input may be specified, for example, via a menu based graphical user interface preprogrammed into the controller 10. Using the user input and the management and navigation information reproduced from the optical disk, the controller 10 controls the sequential reproduction of clip files associated with the specified title or playlist.

For example, if a title is chosen, the controller 10 examines management information, e.g., the file 'index.bdmv' for the chosen title, and determines a movie object and/or a web object pertaining to the chosen title. Afterwards, the controller 10 reproduces an associated playlist by executing the commands written in the movie object and/or the web object found in the movie object file 'MovieObject.bdmv' and/or the web object file 'WebObject.bdmv'. Accordingly, a locally-stored clip file on a placed recorded medium or a remotely-stored additional content file pointed by at least one play item included in the playlist is read out or downloaded from a web server. If additional content data is included in the read or downloaded data, the controller 10 controls a demultiplexer 5 and an AV decoder 6 to separate and decode the additional content data accordingly, otherwise, it conducts ordinary reproducing operation of the A/V clip file.

The reproduced source packets are received by a source depacketizer 4 and converted into a data stream (e.g., an MPEG-2 transport packet stream). The demultiplexer 5 demultiplexes the data stream into encoded video and audio, ENAV, and/or subtitle data. The AV decoder 6 decodes the encoded data to produce the original audio and video, ENAV, and/or subtitle data that was fed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

If the additional content data, i.e., ENAV data is markup language scripts, the AV decoder 6 interprets the ENAV data, instead of decoding, to conduct interpreted operations with the aid of the controller 10.

While FIG. 6 has been described as a recording and reproducing apparatus, it will be understood that only a recording or only a reproducing apparatus may be provided using those portions of FIG. 6 providing the recording or reproducing function.

The present invention, disclosed with respect to a limited number of embodiments, provides a greater level of flexibility in simultaneous reproduction of audio/video data and additional content data and in additional content providing ways than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium having a data structure for managing reproduction of A/V (audio/video) data with a plurality of navigation files of different type recorded on the recording medium, comprising:
   a navigation area storing an index information file, at least one first-type navigation file, and at least one second-type navigation file,
   wherein the index information file defines at least one title of the A/V data, and includes link information mapping the title to either the first-type navigation file or the second-type navigation file based on a type of the title to reproduce,
   wherein each of the navigation files indicates at least one playlist file to reproduce associated with the title,
   wherein the playlist file includes at least one playitem which is a pair of in-point and out-point indicating a playing interval on a time axis of the A/V data, and
   wherein the index information file, the first-type navigation file, the second-type navigation file, and the playlist file are separate files from each other, and have different file name extensions.

2. The recording medium of claim 1, wherein the first-type navigation file includes at least one navigation command for managing reproduction of a first-type title, and the second-type navigation file includes at least one navigation command for managing reproduction of a second-type title.

3. The recording medium of claim 1, wherein the A/V data is stored in a remote server connected through a network.

4. The recording medium of claim 1, wherein the index information file further stores first playback information for managing first playback of the recording medium.

5. The recording medium of claim 4, wherein the index information file includes, for each title, identification information of a first-type navigation file and/or a second-type navigation file that is associated with the title.

6. The recording medium of claim 4, wherein the index information file includes identification information of a navigation file that composes a top menu.

7. The recording medium of claim 6, wherein the navigation file to compose the top menu includes a first-type navigation file and a second-type navigation file.

8. The recording medium of claim 1, wherein the second-type navigation file includes identification information of the first-type navigation file associated therewith.

9. The recording medium of claim 1, wherein the first-type and second-type navigation files are located under different directory areas of the recording medium.

10. A method for recording a data structure for managing reproduction of A/V (audio/video) data with a plurality of navigation files of different type on a recording medium, comprising:
    recording an index information file, at least one first-type navigation file, and at least one second-type navigation file on the recording medium, such that:
    the index information file defines at least one title of the A/V data, and includes link information mapping the title to either the first-type navigation file or the second-type navigation file based on a type of the title to reproduce;
    each of the navigation files indicates at least one playlist file to reproduce; and
    the playlist file includes at least one playitem which is a pair of in-point and out-point indicating a playing interval on a time axis of the A/V data;
    wherein the index information file, the first-type navigation file, the second-type navigation file, and the playlist file are separate files from each other, and have different file name extensions.

11. A method as recited in claim 10, wherein the first-type navigation file includes at least one navigation command for managing reproduction of a first-type title, and the second-type navigation file includes at least one navigation command for managing reproduction of a second-type title.

12. A method as recited in claim 10, further comprising:
    recording first playback information for managing first playback of the recording medium in the index information file.

13. A method as recited in claim 12, further comprising:
    recording, for each title, identification information of a first-type navigation file and/or a second-type navigation file that is associated with the title into the index information file.

14. A method as recited in claim 12, further comprising:
    recording, in the index information file, identification information of a navigation file that composes a top menu.

15. A method as recited in claim 14, further comprising:
    recording, in the navigation file to compose the top menu, a first-type navigation file and a second-type navigation file.

16. A method as recited in claim 10, further comprising:
recording, in the second-type navigation file, identification information of the first-type navigation file associated therewith.

17. A method as recited in claim 10, further comprising:
locating the first-type and second-type navigation files under different directory areas of the recording medium.

18. An apparatus for recording a data structure for managing reproduction of A/V data with a plurality of navigation files of different type on a recording medium, comprising:
a recording unit configured to record data on the recording medium; and
a controller configured to control the recording unit to record an index information file, at least one first-type navigation file, and at least one second-type navigation file on the recording medium, such that:
the index information file defines at least one title of the A/V data, and includes link information mapping the title to either the first-type navigation file or the second-type navigation file based on a type of the title to reproduce;
each of the navigation files indicates at least one playlist file to reproduce; and
the playlist file includes at least one playitem which is a pair of in-point and out-point indicating a playing interval on a time axis of the A/V data;
wherein the index information file, the first-type navigation file, the second-type navigation file, and the playlist file are separate files from each other, and have different file name extensions.

19. An apparatus as recited in claim 18, wherein the first-type navigation file includes at least one navigation command for managing reproduction of a first-type title, and the second-type navigation file includes at least one navigation command for managing reproduction of a second-type title.

20. An apparatus as recited in claim 18, wherein the controller is configured to control the recording unit to record first playback information for managing first playback of the recording medium in the index information file.

21. An apparatus as recited in claim 20, wherein the controller is further configured to control the recording unit to record, for each title, identification information of a first-type navigation file and/or a second-type navigation file that is associated with the title into the index information file.

22. An apparatus as recited in claim 20, wherein the controller is further configured to control the recording unit to record, in the index information file, identification information of a navigation file that composes a top menu.

23. An apparatus as recited in claim 22, wherein the controller is further configured to control the recording unit to record, in the navigation file to compose the top menu, a first-type navigation file and a second-type navigation file.

24. An apparatus as recited in claim 18, wherein the controller is configured to control the recording unit to record, in the second-type navigation file, identification information of the first-type navigation file associated therewith.

25. An apparatus as recited in claim 18, wherein the recording unit comprises an optical pickup unit.

26. An apparatus as recited in claim 18, further comprising:
a user interface configured to communicate information to the controller.

27. A method for reproducing a data structure for managing reproduction of A/V (audio/video) data with a plurality of navigation files of different type recorded on a recording medium, comprising the steps of:
reproducing an index information file, wherein the index information file defines at least one title of the A/V data, and includes link information mapping the title to either the first-type navigation file or the second-type navigation file based on a type of the title to reproduce;
reproducing at least one of a first-type navigation file and a second-type navigation file based on the link information, wherein the navigation file indicates at least one playlist file to reproduce; and
reproducing the indicated playlist file, wherein the playlist file includes at least one playitem which is a pair of in-point and out-point indicating a playing interval on a time axis of the A/V data;
wherein the index information file, the first-type navigation file, the second-type navigation file, and the playlist file are separate files from each other, and have different file name extensions.

28. A method as recited in claim 27, further comprising:
receiving the A/V data from a remote server connected through a network.

29. A method as recited in claim 27, further comprising:
reproducing first playback information for managing first playback of the recording medium included in the index information file.

30. A method as recited in claim 29, further comprising:
reproducing, for each title, identification information of a first-type navigation file and/or a second-type navigation file that is associated with the title, the identification information being included in the index information file.

31. A method as recited in claim 29, further comprising:
reproducing identification information of a navigation file that composes a top menu, the identification information being included in the index information file.

32. A method as recited in claim 31, further comprising:
reproducing a first-type navigation file and a second-type navigation file included in the navigation file to compose the top menu.

33. A method as recited in claim 27, further comprising:
reproducing identification information of the first-type navigation file associated therewith, the identification information being included in the second-type navigation file.

34. A method as recited in claim 27, further comprising:
reproducing the first-type and second-type navigation files under different directory areas of the recording medium.

35. An apparatus for reproducing a data structure for managing reproduction of A/V (audio/video) data with a plurality of navigation files of different type recorded on a recording medium, comprising:
a reproducing unit configured to reproduce data recorded on the recording medium; and
a controller configured to control the reproducing unit to reproduce an index information file, wherein the index information file defines at least one title of the A/V data, and includes link information mapping the title to either the first-type navigation file or the second-type navigation file based on a type of the title to reproduce,
to reproduce at least one of a first-type navigation file and a second-type navigation file based on the link information, wherein the navigation file indicates at least one playlist file to reproduce, and
to reproduce the indicated playlist file, wherein the playlist file indicates at least one playitem which is a pair of in-point and out-point indicating a playing interval on a time axis of the A/V data;
wherein the index information file, the first-type navigation file, the second-type navigation file, and the playlist file are separate files from each other, and have different file name extensions.

36. An apparatus as recited in claim 35, wherein the controller is configured to receive the A/V data from a remote server connected through a network.

37. An apparatus as recited in claim 35, wherein the controller is configured to control the reproducing unit to reproduce first playback information for managing first playback of the recording medium included in the index information file.

38. An apparatus as recited in claim 37, wherein the controller is further configured to control the reproducing unit to reproduce, for each title, identification information of a first-type navigation file and/or a second-type navigation file that is associated with the title and included in the index information file.

39. An apparatus as recited in claim 37, wherein the controller is further configured to control the reproducing unit to reproduce identification information of a navigation file that composes a top menu, the identification information being included in the index information file.

40. An apparatus as recited in claim 39, wherein the controller is further configured to control the reproducing unit to reproduce a first-type navigation file and a second-type navigation file included in the navigation file to compose the top menu.

41. An apparatus as recited in claim 35, wherein the controller is configured to control the reproducing unit to reproduce identification information of the first-type navigation file associated therewith, the identification information being included in the second-type navigation file.

42. An apparatus as recited in claim 35, wherein the reproducing unit comprises an optical pickup unit.

* * * * *